2,874,090
Patented Feb. 17, 1959

2,874,090

SUNBURN PREVENTIVE N-SALICOYL-p-AMINO-PHENOL COMPOSITIONS

David X. Klein, Upper Montclair, N. J., assignor to Heyden Newport Chemical Corporation, a corporation of Delaware No Drawing. Application August 24, 1954
Serial No. 451,979

5 Claims. (Cl. 167—90)

The present invention relates to cosmetic preparations for protecting the skin against sunburn and particularly relates to sunburn and suntan cosmetic preparations for protecting the skin against burning by filtering out most of the harmful rays, while allowing passage of a large part of the rays which produce non-harmful tanning of the skin.

Sunburn preventives, and particularly those which are intended to protect the wearer against harmful sunburn while permitting healthful tanning, should meet a number of requirements. While many chemical compounds have been proposed for use as sunscreen agents in cosmetic preparations, many of the proposed compounds are unsatisfactory for failure to meet one or more of these requirements. The sunscreen agent should filter out most of the actinic rays in the region of 2950–3150 A. while allowing passage of most of the rays in the region of 3150–3650 A. The rays in the first mentioned region are the rays which are most harmful in causing severe sunburn. The rays in the higher region are desirable for producing the tan commonly sought by the wearer. The cosmetic preparation also should have an effective life of at least two hours and, preferably, of four hours or more. Many proposed sunscreen agents have failed in that their effective life is extremely short as they are either chemically changed or have their sunscreening properties destroyed upon exposure to ultraviolet light. Some sunscreen agents have an effective life of only a few minutes. In addition, the sunscreen agent should have no undesirable effect or any anesthetic or therapeutic action on the skin. It is desirable that the sunscreen agent should be soluble in a diversity of solvents, including both oils and non-oily substances so that it can be readily incorporated in the vehicle or base of the preparation.

It has been discovered that N-salicoyl-p-aminophenol is a chemical compound which fulfills the foregoing requirements for a sunscreen agent. This compound has the following formula:

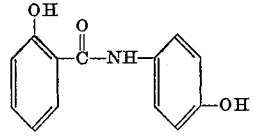

The compound absorbs most of the actinic rays in the region of 2950–3150 A. but transmits rays in the region of 3150–3650 A. It does not discolor or develop odor on exposure to ultraviolet radiation and has no anesthetic properties, and is both non-toxic and non-irritating to the skin.

It has been found that the absorption characteristics of N-salicoyl-p-aminophenol are not changed to any appreciable degree by exposure to ultra-violet radiation for twenty-four hours. Many proposed sunscreen agents which have the desired absorption characteristics have been found to lose these characteristics after a very short exposure to ultra-violet light. The useful life of cosmetic preparations containing such agents is too short to have any worthwhile effect when applied to the skin of the wearer under normal conditions.

EXAMPLE I

In this series of comparative tests, the effectiveness of N-salicoyl-p-aminophenol was compared with that of other sunscreen agents including dibenzalazine and 2-ethylhexyl salicylate, which have been approved by the United States Department of Defense for use in sunburn preventive preparations. The effectiveness of the present sunscreen agent also was compared with that of ethyl-p-aminobenzoate which has been proposed for such use and also with diethylene glycol salicylate, as a number of salicylates of glycols have been proposed as sunscreen agents. The compounds were incorporated in a lotion-type vehicle consisting of 89.5% ethanol, 5.5% castor oil and 5% water. Each of the solutions was applied to the skin on the inner areas of the forearms of each of six subjects. The areas of each subject were separated by tape. The treated areas were exposed to the light of two sun lamps at a distance of thirty inches for periods of time varied according to the skin characteristics of the subjects. The areas were examined twenty-four hours after exposure to this drastic treatment and the average results are set forth in Table 1. The percent concentration is the percentage of the sunscreen agent in the lotion.

Table 1

|  | Concentration | | |
| --- | --- | --- | --- |
|  | 4% | 2% | 1% |
| N-salicoyl-p-aminophenol | No effect | Very slight reddening. | Slight reddening. |
| Dibenzalazine | Slight reddening | Slight reddening | Do. |
| 2-ethylhexyl salicylate | Reddening |  |  |
| Ethyl p-aminobenzoate | Slight reddening |  |  |
| Diethylene glycol salicylate | Reddening |  |  |

The N-salicoyl-p-aminophenol was more effective at these concentrations than the other agents including the two agents which have been approved by the United States Department of Defense.

EXAMPLE II

In this comparative test, N-salicoyl-p-aminophenol, ethyl p-aminobenzoate and diethylene glycol monosalicylate were evaluated in a cream paste vehicle similar to that described in the United States military specification for "Sunburn Preventive Preparation, Cream Paste," MIL–S–11262A, April 10, 1952. This cream paste vehicle contained the following materials:

Ingredient: Parts by weight
    Light amber petrolatum _____ 36.5
    Stearyl alcohol _____ 3.5
    Mineral oil _____ 15
    Sesame oil _____ 2
    Calcium stearate _____ 10
    Kaolin _____ 30

These creams were prepared containing 0.4% of N-salicoyl-p-aminophenol, 0.9% ethyl p-aminobenzoate and 4.2% of diethylene glycol monosalicylate. The various creams were applied to randomly chosen areas on the lower back regions of each of six subjects. Each subject was then exposed to the light of four sun lamps at a distance of thirty inches for fifteen minutes. The subjects were examined twenty-four hours later to determine the effectiveness of the compositions. The following average results were obtained:

Table 2

|  | Concentration, percent | |
| --- | --- | --- |
| N-salicoyl-p-aminophenol | 0.4 | Medium reddening. |
| Ethyl p-aminobenzoate | 0.9 | Do. |
| Diethylene glycol monosalicylate | 4.2 | Do. |

The preferred amount of N-salicoyl-p-aminophenol incorporated in the cosmetic preparation depends upon a number of factors including the character of the vehicle and the thickness of the film normally formed on the skin by application thereto of the preparation. Some cosmetic vehicles and particularly those containing oils reflect some of the light and smaller amounts of sunscreen agent are required. Preferably, the cosmetic preparation is formulated to contain at least about 0.4% of the compound. As the compound has no harmful effect on the skin, it can be employed in quite large amounts, although about 4% is the preferred upper limit for most purposes. Larger or smaller amounts may be used. In addition, other protective compounds may be incorporated in the sunburn preventive. For example, where exposure is expected to be especially severe, pigments or other sunscreen compounds may be used to widen the range of blocked rays.

I claim:

1. A cosmetic preparation for protecting the skin against sunburn comprising an oil containing cosmetic vehicle and an effective amount of N-salicoyl-p-aminophenol.

2. A cosmetic preparation for protecting the skin against sunburn comprising an oil containing cosmetic vehicle and at least 0.4% by weight of N-salicoyl-p-aminophenol.

3. A cosmetic cream for protecting the skin against sunburn comprising a cream base and at least 0.4% N-salicoyl-p-aminophenol.

4. The method of protecting skin against sunburn comprising applying to the skin a film of cosmetic preparation including a cosmetic vehicle and N-salicoyl-p-aminophenol.

5. The method of protecting skin subject to sunburn against sunburn comprising applying to the skin a film of cosmetic preparation including a cosmetic vehicle and from 0.4% to 4% of N-salicoyl-p-aminophenol, thereby protecting the skin against such sunburn.

References Cited in the file of this patent

Military Specification: Sunburn-Preventive Preparation, Cream Paste, MIL–S–11262A, Apr. 10, 1952.

Weizmann: Jour. of Organic Chem., vol. 13, 1948, pp. 796–799.

Kumler: Jour. of Am. Pharm. Assn., Sci. Ed., September 1952, pp. 492–493.

Giese: Am. Perf. and Ess. Oil Rev., September 1950, pp. 197–201.

Goodman: Cosmetic Dermatology, 1936, pp. 525, 528.